G. KOCH.
AUTOMOBILE LOCK.
APPLICATION FILED JUNE 14, 1920.
1,408,518.  Patented Mar. 7, 1922.
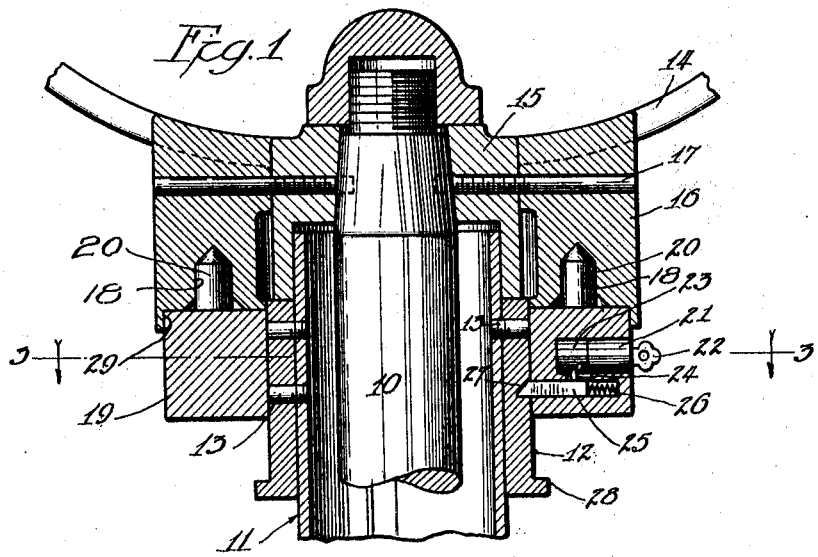
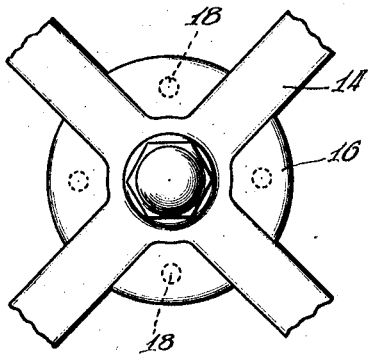
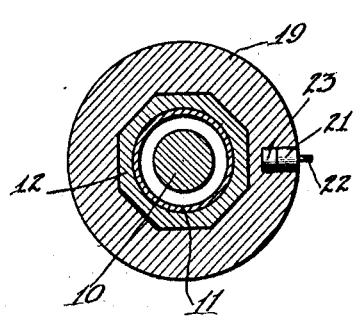
WITNESS:  
Harry S. Gaither
INVENTOR.  
Gotthardt Koch  
BY  
Clarence J. Loftus  
ATTORNEY.

UNITED STATES PATENT OFFICE.

GOTTHARDT KOCH, OF CHICAGO, ILLINOIS.

AUTOMOBILE LOCK.

1,408,518.  Specification of Letters Patent.  Patented Mar. 7, 1922.

Application filed June 14, 1920. Serial No. 388,942.

*To all whom it may concern:*

Be it known that I, GOTTHARDT KOCH, a citizen of the Republic of Germany, residing at Chicago, in the county of Cook and State of Illinois, have invented certain new and useful Improvements in Automobile Locks, of which the following is a specification.

My invention pertains to locks for automobiles and the like and particularly locks for steering wheels and steering mechanism of such devices. It is an object of my invention to provide a new, novel, simple, useful efficient durable and inexpensive device for this purpose adapted to securely lock the steering wheel or steering mechanism against unauthorized movement. It is a further object to provide a device of this class with few parts none of which may be termed "wearing parts" mounted adjacent to the steering wheel and readily accessible therefrom. It is a further object to provide a device of this kind in which a portion of the lock may be mounted in connection with or form a part of the steering wheel thus reinforcing and strengthening the same. It is a further object to provide a lock of this kind which can be readily thrown into locked position either while the car is moving or at rest and without the use of a key and without removing the hands from the steering wheel if desired. It is a further object to provide a lock of this kind with which the steering wheel may be locked in different positions. It is a further object to provide a key controlled lock of this kind in which the lock pin is relieved of all strains in attempting to move the wheel when in locked position.

The above and other features of novelty, advantages and capabilities will become apparent from the detailed description of the accompanying drawings in which I have illustrated a lock embodying one form of my invention but the construction there shown is to be understood as illustrative only and not as defining the limits of my invention.

Figure 1. is a vertical sectional view showing a lock embodying one form of my invention mounted in place and showing it in locked position with a portion of the steering wheel, steering post and steering stem broken away. Figure 2. is a plan view of the same showing portions of the steering wheel broken away and Figure 3. is a sectional view taken on the line 3—3 of Figure 1.

Referring to the drawing in detail, the steering stem "10" for an automobile or the like is of the usual construction and extends downwards where its lower end is connected through the usual means for steering the machine. As is usual in machines of this kind the steering stem is surrounded by a tubular steering post "11." Rigidly mounted on this post near the upper end is a sleeve "12" whose outer surface is in the form of an octagon as best shown in Fig. 3. This sleeve is securely fixed to the steering post by means of a plurality of headless threaded screws "13." The steering wheel "14" has the usual hub "15" by means of which it is mounted on the steering stem "10." Rigidly fixed to the steering wheel "14" is a casting forming a lock receiving member "16" which is provided with grooves to receive the spokes of the steering wheel as best shown in Figs. 1 and 2. as a result of which the spokes and wheel near the hub are greatly strengthened. The lock receiving member is also rigidly fixed to the hub "15" and the steering stem by means of the headless screws or bolts "17," two of which are shown in Fig. 1. A further advantage in providing grooves in the lock receiving member to receive the spokes of the steering wheel is to relieve the screws "17" against shearing strains. The bottom surface of the lock receiving member "16" is provided with a plurality of recesses "18" having the outer and inner edges bevelled as best shown in Fig. 1. In the particular form illustrated, I have shown four such recesses but it is understood that any desirable number may be used.

Slideably but non-rotatably mounted on the sleeve "12" is a slideable locking member "19" whose inner surface is designed to register with the outer surface of such sleeve. The slideable locking member is provided with a plurality of locking lugs "20" formed integral therewith and having their upper ends bevelled so as to facilitate the meshing or registering of them with the bevelled recesses "18" when the slideable locking member is raised to locked position. The slideable locking member is provided with a comparatively large bore in which is fitted in any well known manner a barrel "21" of a key controlled lock of the ordinary or any preferred form of construction which barrel has the usual mechanism, not necessary to be shown, operated by the key "22". A projection "23" which extends inwardly from the barrel "21" is provided with an eccentric slot to receive the lug "24" which is fixed to the lock pin "25" which lock pin is mounted in a comparatively small bore in the locking member and is normally pressed outwardly by means of a compression spring "26". The outer end of the lock pin "25" is bevelled as shown in Fig. 1. and is designed to register or mesh with the bevelled notch "27" in the sleeve "12".

As shown in Fig. 1, the parts are in locked position and the steering wheel is held securely against movement. When it is desired to release the steering mechanism all that is necessary is to insert and turn the key "22" which through the medium of suitable tumblers contained in the barrel "21" turns the projection "23" in the desired direction which turning through the connection shown withdraws or retracts the lock pin "25" from the notch "27" and allows the slideable locking member to drop of its own weight until it reaches the flange "28" (out of locking position) where it is halted by virtue of the integral flange "28". When it is desired to lock the steering mechanism whether the car is moving or at rest all that is necessary is for the operator to simply reach down with his fingers without removing his hands from the wheel and without the use of a key, pull upwardly on the slideable locking member, and snap the lugs "20" into mesh or register with the recesses in the stationary lock receiving member where it securely holds the wheel against movement until the key is inserted to withdraw the lock pin "25" to allow the slideable locking member to drop away from the stationary lock receiving member.

To prevent an unauthorized person from inserting a chisel or the like between the slideable locking member and the stationary lock receiving member for the purpose of prying them apart when in locked position or from cutting or shearing the lugs "20" the stationary lock receiving member is provided with a substantially integral flange "29" which fits down over the upper edge of a slideable locking member when in locked position. Further by this arrangement it insures against pounding the lock carrying member downwardly by means of a hammer or the like as its upper end is entirely covered and protected by the stationary lock receiving member.

By providing a plurality of recesses in the stationary lock receiving member the steering wheel can be locked in any desired position so as to insure against towing the car away. That is to say before throwing the slidable locking member into engagement with the stationary lock receiving member, the operator simply turns the steering wheel so as to crank his front wheels either to the right or to the left and then locks them in that position.

Another advantage in being able to readily and quickly bring the slideable locking member into engagement with the stationary lock receiving member without removing the hands from the steering wheel is to insure one against having his car stolen while driving. If he is taken unawares while driving his car as is sometimes the case, he can instantly lock it without even removing his hands from the steering wheel.

Having thus described one form of my invention, I claim:

In a lock for automobiles and the like, the combination of a steering column, a steering post, a steering wheel provided with a hub having a flange portion extending downwardly and over the upper end of the steering column, a sleeve surrounding the steering column and engaging the lower end of said flange, means for rigidly securing said sleeve to said column, a slidable locking member slidably mounted on said sleeve, an integral flange at the lower end of said sleeve to limit the downward movement of said slidably locking member, a lock receiving member mounted around said hub and provided with an outer downwardly extending flange adapted to house the upper portion of said slidably locking member when in locked position, said lock receiving member being provided with a plurality of beveled borings, a plurality of beveled lugs or pins on said slidable locking member, adapted to engage said borings or openings when in locked position and a key controlled lock for holding said slidably locking member in locked position on said sleeve substantially as and for the purposes set forth.

In witness whereof, I hereunto subscribe my name to this specification in the presence of two witnesses.

GOTTHARDT KOCH.

Witnesses:
MARIE WALFORTH,
JOSEPHINE HOLQUIST.